INVENTOR.
JOHN F. FLEMING

June 17, 1969  J. F. FLEMING  3,450,219
STAIR-CLIMBING VEHICLE
Filed March 13, 1967  Sheet 3 of 3

INVENTOR.
JOHN F. FLEMING
BY

United States Patent Office 3,450,219
Patented June 17, 1969

3,450,219
STAIR-CLIMBING VEHICLE
John F. Fleming, 1191 Del Mar Parkway,
Aurora, Colo. 80010
Filed Mar. 13, 1967, Ser. No. 622,700
Int. Cl. B62d 57/02, 51/06; B62b 5/02
U.S. Cl. 180—8                                    9 Claims

ABSTRACT OF THE DISCLOSURE

This invention relates to a power assisted stair-climbing vehicle or dolly for use in transporting heavy objects and the like up and down stairs or traversing surfaces having abrupt changes in elevation.

---

The invention is particularly directed to an improved hand-guided moving dolly having a plurality of wheels, each of which is mounted on one of the radial arms of a rotatable spider. The wheels and the spider are connected in the form of an epicyclic train, all of which is driven by a single power source. The ratio of the arm lengths to the wheel radii is such that the moment necessary to turn the spider is slightly greater than the moment needed to turn the wheels on a flat surface. In operation, the power applied to the wheels will move the dolly horizontally until it contacts the first riser of a flight of stairs. The moment needed to turn the wheels now becomes greater by reason of the obstruction, thereby causing the spider to rotate and climb the first step. The torque on the wheels remains constant during rotation of the spider and, as soon as the vertical transition is complete, the torque on the wheels will cause the horizontal movement of the dolly to continue. The wheels and spiders on each side of the dolly are connected and driven through a differential drive whereby the spiders on each side are caused to rotate together. A drive of this type causes the dolly to square with the stair step before it begins to climb.

In the prior art, there are numerous stair-climbing vehicle designs which utilize a multiple-armed wheel-supporting spider driven in rotation so as to place rotatively supported wheels located near the ends of the arms successively on wheel-supporting surfaces such as a flight of stairs. Some vehicles utilize wheels which lock during connection with the remainder of the vehicle and are, therefore, free to rotate about their individual axes. Vehicles of this type are inherently dangerous since the operator has no control over the rotation of the wheels which might uncontrollably roll backward over the edge of the stairs during this vertical transition.

Other such vehicles utilize wheels having driving connections with the spider or with the stationary portion of the vehicle which force the wheels to rotate in a prescribed manner even while the spider is rotating. These vehicles are also dangerous because, as the wheels rotate, they may roll over the edge of the stair while the spider is rotating, causing the vehicle to overturn. This type of vehicle is also undesirable since it forces the wheels to slip on the supporting surface when once the wheels have come in contact with an obstruction.

There are still further types of vehicles which employ two separate power sources, one for the wheels and spider, respectively. To operate the climbing device, the operator must separately actuate each power source, one at a time. On some stairs, it would be necessary to alternately actuate the wheels and then the spider after climbing each step.

In the climbing vehicle of the present invention, there is no complex operator function as just mentioned. Operation of both the wheels and the spider is carried out by a single power source. The actuation of the spider takes place automatically when an obstacle is encountered. Likewise, when the top of the stair is attained, the wheels automatically take over and the spider stops turning. When the spider is rotating, the wheels are not turning relative to the supporting surface, thus avoiding the dangerous situations mentioned in the prior art devices.

It is, therefore, the principal object of the present invention to provide a new and improved power assisted stair-climbing vehicle which climbs stairs or other surfaces having abrupt changes in elevation.

Another object of the invention is to provide a stair-climbing vehicle having a single power source in driving connection with the wheels and the spider whereby, when the torque necessary to roll the wheels across a horizontal surface is exceeded by a predetermined amount, the spider will rotate.

A further object of the invention is to provide a stair-climbing vehicle which will not allow the wheels to slip or freewheel on the load bearing surface while the spider is rotating.

A still further object of the invention is to provide a stair-climbing vehicle having a differential drive whereby the vehicle approaching from an angle will center itself with respect to the stair before climbing same.

A further object of the invention is to provide a power assisted stair-climbing vehicle which automatically converts from a horizontal running configuration to a climbing configuration upon contacting an obstacle.

Further objects of the invention will be in part apparent and in part pointed out specifically hereinafter in connection with the description of the drawings that follows and in which.

Figure 1:
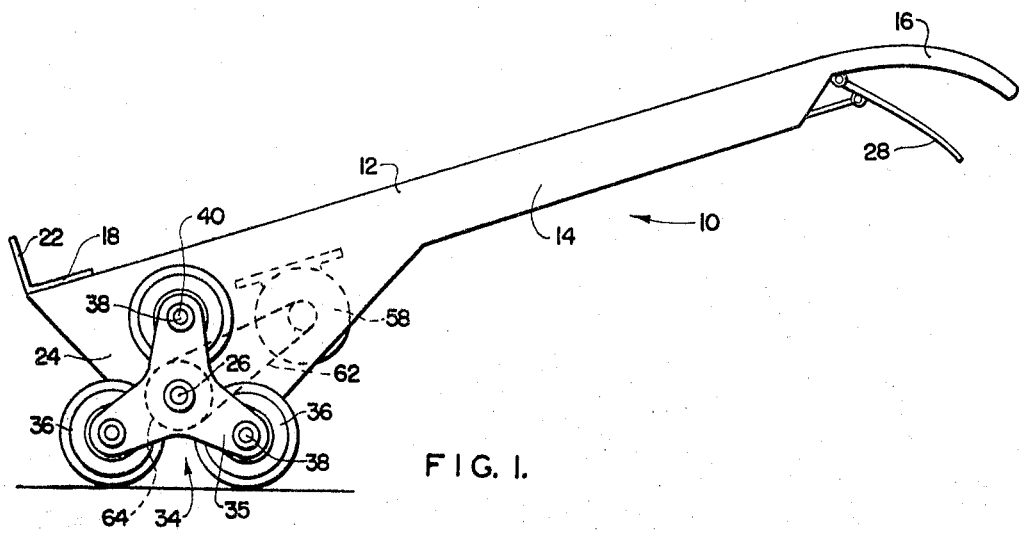
FIGURE 1 is a side elevational view of the stair-climbing vehicle embodying the present invention in the horizontal running position.
Figure 2:
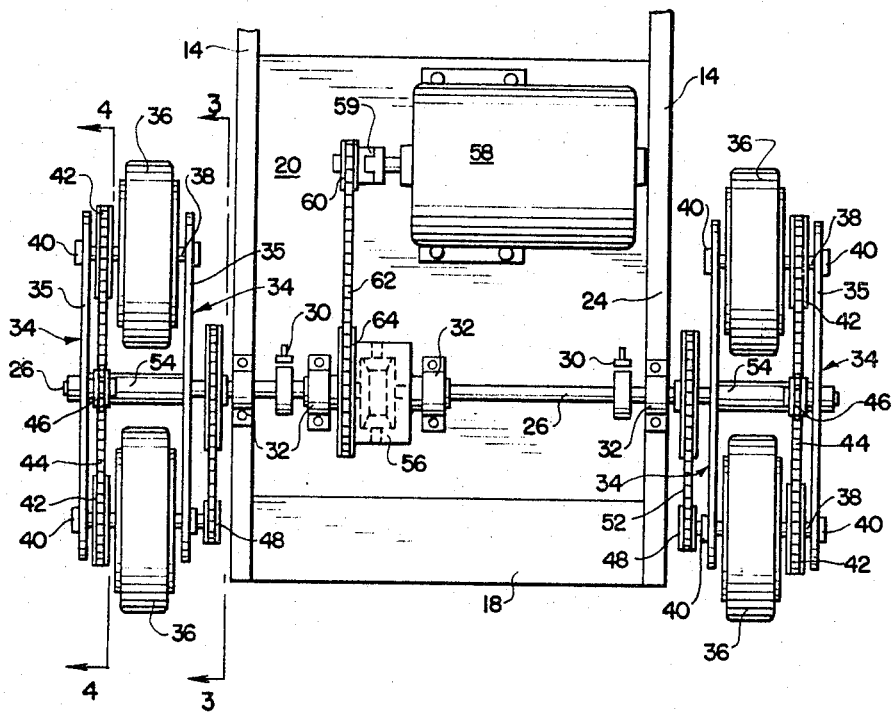
FIGURE 2 is a bottom plan view with portions of the frame omitted to conserve space.

Referring now to the drawings for a detailed description of the invention and, more specifically, to FIGURES 1 and 2 for this purpose, it will be seen that the stair-climbing vehicle has been designated in its entirety by reference numeral 10. The frame or body 12 may vary widely in form and construction. In the preferred form illustrated, the frame is shown having longitudinal side members 14 terminating at their upper ends in hand grips 16. The side members 14 are connected by a cross member 18 and a base plate 20 to form a rigid rectangular structure. The member 18 is positioned at the lower end of the frame and has an upwardly extending flange 22 which provides a load carrying lip for the object being transported. At the lower extremities of the side members 14 is a widened portion 24 which provides a mounting base for the primary axle 26.

Mounted on the frame adjacent the hand grips 16 is a mechanical hand lever 28. The lever operates a set of brakes 30 which will later be described in detail in conjunction with the operation of the vehicle.

Figure 3:
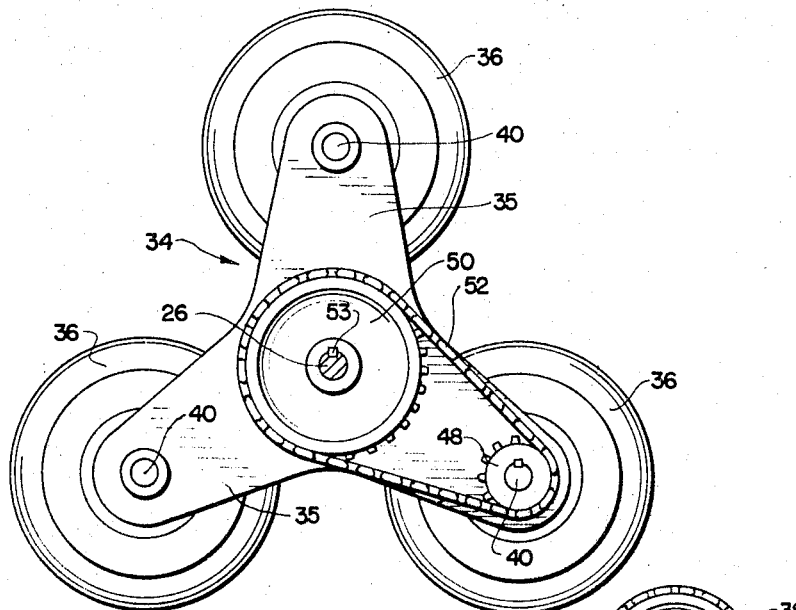
FIGURE 3 is a cross sectional view on an enlarged scale substantially on a plane indicated by the line 3—3 of FIGURE 2.
Figure 4:
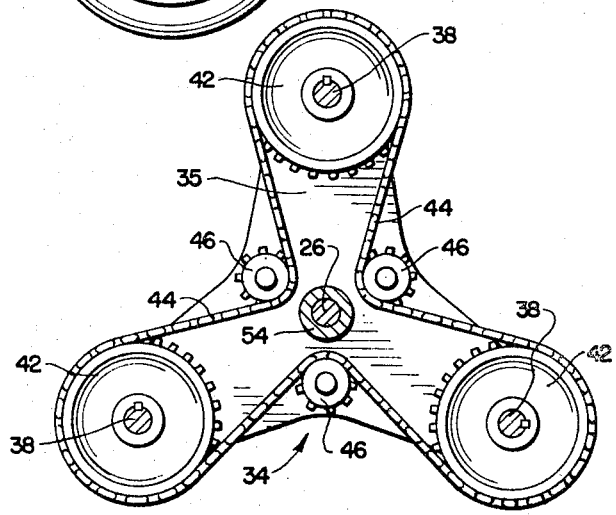
FIGURE 4 is a cross sectional view on an enlarged scale substantially on a plane indicated by the line 4—4 of FIGURE 2.

The vehicle 10 is supported by a primary axle 26 which is attached to the side members 14 and plate 20 by a set of journal bearings 32, thereby allowing the axle to freely rotate therein (as seen in FIGURE 2). Positioned at each end of the axle 26 are a pair of spiders 34 having radially extending legs 35. In the particular form of the invention illustrated, each spider has three legs 35. Rotatably journaled at the outer ends of each leg 35 is a rubber-tired wheel 26. Each wheel 36 is mounted on a secondary axle 38 which is in turn journaled at each end in bearings 40. Integrally mounted on axles 38 in concentric juxtaposed relation with the wheels 36 are a plurality of drive sprockets 42. The sprockets 42 on each spider 34 are connected by a common drive chain 44 as seen in FIGURE 4. The chain 44 passes behind a series of idler sprockets 46 so as to keep the chain from contacting the edge of the step during the rotation of the spider. By reason of chain 44, all of the wheels 36 on each spider must rotate together at the same speed. Concentrically positioned on the opposite end of one of the axles 38 in each spider is an additional small sprocket 48, as seen in FIGURE 3. Small sprocket 48 is driven by a larger drive sprocket 50 through a drive chain 52. Sprocket 50 is integrally mounted on the primary axle 26 by key 53. Journal bearings 54, which are mounted in the center of the spiders 34, are freely rotatable on the outer ends of the axle 26 (as seen in FIGURE 2).

Primary axle 26 drives the wheels 36 and spider 34 which are connected by an epicyclic drive as just mentioned above. Power is applied to axle 26 through a common differential gear box 56 and motor 58. Although an electric motor 58 is illustrated, any type power source could be used. The motor 58 transfers its energy to the differential 56 by way of clutch 59, sprocket 60, chain 62 and sprocket 64, as seen in FIGURE 2. The energy applied to the primary axle 26 can be controlled in a variety of ways. For example, the clutch 59, which could be magnetic or mechanical, would be always left engaged. The movement of the vehicle would thereby be controlled by merely turning the motor switch on or off. The drag of the motor 58 would provide adequate braking in the absence of brakes 30. Another way to control the vehicle 10 would be by connecting the hand brake lever 28 to a switch or linkage which would disengage the clutch 59. In a control of this type, the clutch would disengage and, at the same time, the brakes would be applied.

OPERATION

Figure 5:
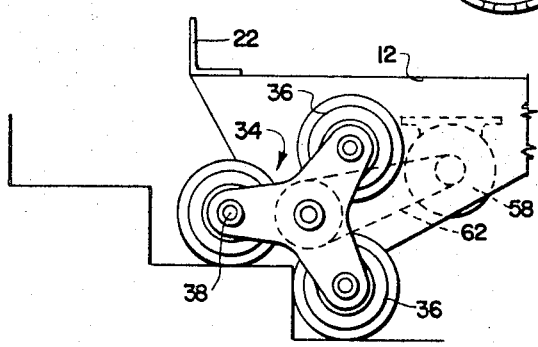
FIGURE 5 is a side elevational view of the vehicle in the climbing position with portions of the frame broken away to conserve space.

In operating the vehicle 10, the power source 58 is activated, whereby mechanical energy is passed through the differential to the primary axle 26. Sprocket 50 mounted on axle 26 in turn transfers the torque to one of the wheels by way of chain 52. Since all of the wheels on each spider are connected by chain 44, they will all move accordingly. When the wheels 36 come in contact with a step as seen in FIGURE 5, the moment necessary to turn the wheels increases until it exceeds the moment needed to rotate the spider. Since the wheels cannot move, the torque supplied to sprocket 48 causes the spider 34 to rotate about the axle 26 while a constant torque is maintained on the load bearing wheel 36.

The various moments and forces acting upon the vehicle 10 at various times during its climbing cycles are illustrated in diagrammatic form in FIGURES 6 and 7, which will now be described in detail.

POSITION A (FIGURE 6)

Figure 6:
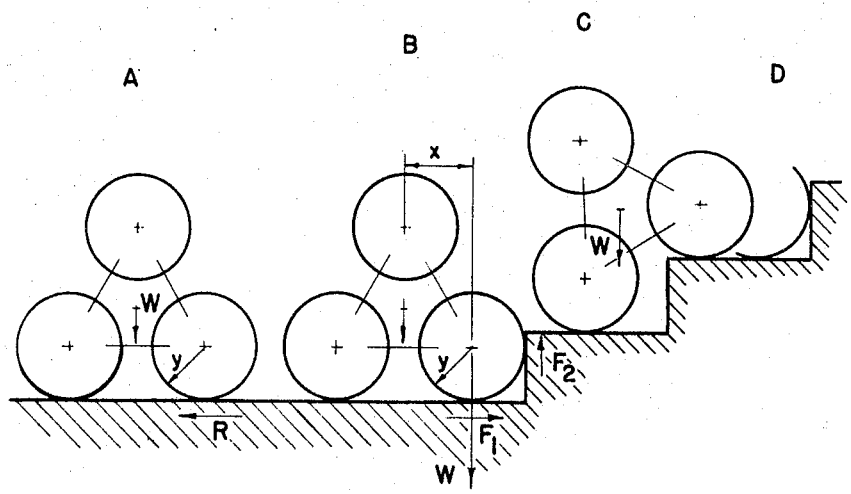
FIGURE 6 is a diagrammatic view of the wheels and force vectors of the vehicle in four different positions identified by A, B, C and D during its horizontal and vertical transition.
Figure 7:
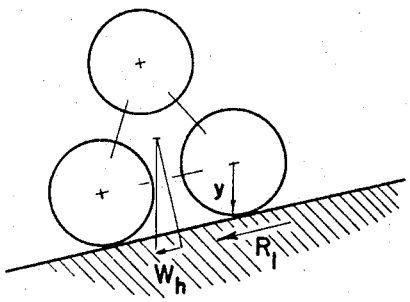
FIGURE 7 is a diagrammatic view of the wheels and force vectors of the vehicle while moving along a slight incline.

When the vehicle is moving across an unobstructed horizontal surface, the forces effecting the wheels and spider of the vehicle are as shown in Position A in FIGURE 6. The weight W carried by the vehicle is substantially acting at the center of the spider in a vertical direction. The moment necessary to horizontally move the vehicle is a resistance force R (acting at the point of contact of the wheel in a horizontal direction) multiplied by the radius of the wheel y which is represented by the moment Ry. Of course, the torque supplied from the motor 58 to the wheels would always exceed the moment Ry necessary to move the vehicle. As long as the surface being traversed remains essentially flat, the moment Ry will not change except for minor variances caused by variable loads carried by the vehicle 10.

POSITION B (FIGURE 6)

When the forward wheel comes in contact with the first stair riser, the moment needed to turn the wheels substantially increases. The moment necessary to rotate the spider is the weight of the load W multiplied by the moment arm $x$, which is illustrated in the drawings. As soon as the motor torque applied to the wheels exceeds $Wx$, the spider will begin to rotate and climb the first step. Once the spider begins to rotate, the moment arm $x$ decreases, thereby causing the spider moment to decrease. As the load W passes over the center of the load bearing wheel, the spider moment becomes zero and load W begins to pull the motor. Until the second wheel comes in contact with the next tread, the motor acts as a brake. Although the spider moment $Wx$ is greater than the necessary rolling moment $Ry$, it is less than the frictional moments $(F_{1y}+F_{2y})$ needed to slide or skid the wheels on their respective bearing surfaces. If this were not the case, the spider would not rotate but would merely spin its wheels when contact was made with a vertical obstruction.

POSITION C (FIGURE 6)

Once the spider has climbed the first tread, the continuous torque on the wheels will cause them to move forward until contact is made with the second step (Position D). Once the riser is contacted, the previously mentioned cycle is repeated as the spider climbs the next step. Any depth of stair tread can be traversed with the same wheel spacing of the present vehicle.

The spider moment $Wx$ is predetermined by the spacing between the wheels on the spider. The greater the spacing, the greater is the moment arm $x$. The spider moment $Wx$ is sufficiently greater than the rolling moment $Ry$ so that the spider will not accidentally rotate when the wheels contact a minor obstruction or traverse a slight incline as shown in FIGURE 7. The rolling moment necessary in FIGURE 7 would be $R_{1y}(R_1=R+W_h)$ which is greater than $Ry$, but still less than the spider moment $Wx$.

When the vehicle contacts a stair or an angle so that the wheels on one side contact before those on the other, the differential 56 allows the vehicle to square with the stair before the spiders begin to rotate. Otherwise, the spiders 34 on each side of the vehicle would be separately rotating at different times, which would provide a dangerous situation. When it is desirous to guide the vehicle around a curve, the situation arises where the increased drag on the inside wheel could cause the one spider 34 to rotate in the absence of a differential.

Having thus described the several useful and novel features incorporated in the stair-climbing vehicle of the present invention, it will be seen that the many worthwhile objectives for which it was designed have been achieved. Although but a single specific embodiment of the vehicle has been illustrated and described herein, I realize that certain changes may well occur to those skilled in the art within the broad teaching thereof; hence, it is my intention that the scope of protection afforded hereby shall be limited only insofar as said limitations are expressly set forth in the appended claims.

I claim:
1. A self-propelled vehicle of the type adapted to climb steps which comprises: a frame; a split drive shaft having the two parts thereof journalled for rotation on the frame in substantially horizontal coaxial end-to-end relation extending transversely thereof, the adjacent end portions being spaced apart; drive means carried by the frame; a differential bridging the space between the adjacent ends of the drive shaft and operatively connecting said drive means to said two parts; a pair of spiders journalled for free relative rotation on the remote ends of the drive shaft in transversely-spaced substantially parallel relation to one another, each of said spiders including a hub-forming portion and at least three arms extending radially from said hub-forming portion in substantially equiangularly spaced relation to one another, both spiders having the same number of arms of substantially the same length; a plurality of wheels; each of said wheels being mounted on the free end of a respective one of said arms remote from the hub-forming portion for rotation about an axis lying in spaced substantially parallel relation to the axes of rotation of the wheels on the other arms of the same spider and the axis of the drive shaft, each of said wheels being movable into ground-engaging position beneath the frame upon rotation of the spider carrying same; first power transfer means operatively interconnecting all the wheels on each spider for conjoint rotation in the same direction at essentially the same speed; and, second power transmission means operatively connecting one wheel on each spider to the part of the drive shaft upon which said spider is journalled; said first and second power transmission means cooperating with one another and with the differential to drive the vehicle along the ground without rotating either spider whenever all the wheels on at least one of said spiders are essentially unrestrained and free to roll, and said first and second power transmission means cooperating with one another and with the differential to turn both spiders in the same direction and at essentially the same speed without rotating any of the wheels whenever at least one wheel on both of said spiders is restrained and prevented from turning.

2. The self-propelled step-climbing vehicle as set forth in claim 1 which includes: clutch means interposed between the drive means and driven part of the drive shaft operative upon actuation to break the driving-connection therebetween; brake means operative upon actuation with the clutch means actuated to stop the drive shaft; and, control means connected to both the clutch and brake means operative to actuate same and stop the drive shaft substantially simultaneously with its being disconnected from the drive means.

3. The self-propelled step-climbing vehicle as set forth in claim 1 in which: the second power transmission means comprises a circular drive member mounted on each part of the drive shaft for concentric rotation therewith about its axis; a circular driven member mounted on one wheel of each spider for concentric rotation therewith about its axis in essentially coplanar relation with the adjacent drive member; and, an endless flexible power transfer element reaved around each coplanar set of drive and driven members so as to form a driving connection therebetween.

4. The self-propelled step-climbing vehicle as set forth in claim 3 in which: the drive and driven members comprise sprocket gears and the power transfer element is a sprocket chain.

5. The self-propelled step-climbing vehicle as set forth in claim 1 in which: the first power transmission means comprises a circular member carried by each wheel for rotation therewith about a common axis of rotation and in essentially coplanar relation with the like circular members carried by the other wheels on the same spider; and, an endless flexible power transfer element reaved around all the circular members on each spider so as to form a driving connection therebetween.

6. The self-propelled step-climbing vehicle as set forth in claim 5 in which: the circular members comprise sprocket gears and the power transfer element is a sprocket chain.

7. The self-propelled step-climbing vehicle as set forth in claim 5 in which: idler means are journaled for rotation for rotation on each spider between the radial arms thereof and adjacent its hub-forming portion, the endless power transfer element being reaved across the side of said idler means adjacent the hub-forming portion as it passes between the circular members so as to keep the space between the radial arms unobstructed to receive the corner of a step.

8. The self-propelled step-climbing vehicle as set forth in claim 7 in which: the idler means comprise additional circular members of the same type included in the first power transfer means.

9. The self-propelled step-climbing vehicle as set forth in claim 8 in which: the circular members in both the first power transfer means and the idler means comprise sprocket gears; and, in which the endless power transfer element is a sprocket chain.

References Cited

UNITED STATES PATENTS

| 2,931,449 | 4/1960 | King | 180—8 |
| 3,241,848 | 3/1966 | Flory | 280—5.26 |
| 3,283,839 | 11/1966 | Brown et al. | 180—8 |
| 3,348,518 | 10/1967 | Forsyth et al. | 180—8 |

FOREIGN PATENTS 1,310,268  10/1962  France.

LEO FRIAGLIA, *Primary Examiner.*

U.S. Cl. X.R.

280—5.26